US010428912B2

(12) United States Patent
Hwang et al.

(10) Patent No.: US 10,428,912 B2
(45) Date of Patent: Oct. 1, 2019

(54) TRANSMISSION FOR VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Hyun Sik Kwon, Seoul (KR); Ki Tae Kim, Incheon (KR); Won Min Cho, Hwaseong-si (KR); Jae Chang Kook, Hwaseong-si (KR); Seong Wook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 139 days.

(21) Appl. No.: 15/831,944

(22) Filed: Dec. 5, 2017

(65) Prior Publication Data

US 2019/0017577 A1 Jan. 17, 2019

(30) Foreign Application Priority Data

Jul. 12, 2017 (KR) ........................ 10-2017-0088224

(51) Int. Cl.
*F16H 3/66* (2006.01)

(52) U.S. Cl.
CPC ............ *F16H 3/666* (2013.01); *F16H 3/663* (2013.01); *F16H 2200/0073* (2013.01); *F16H 2200/0091* (2013.01); *F16H 2200/201* (2013.01); *F16H 2200/2012* (2013.01); *F16H 2200/2025* (2013.01); *F16H 2200/2048* (2013.01); *F16H 2200/2097* (2013.01)

(58) Field of Classification Search
CPC ... F16H 2200/2048–2061; F16H 3/666; F16H 3/663; F16H 2200/2097; F16H 2200/201; F16H 2200/2012
See application file for complete search history.

(56) References Cited

U.S. PATENT DOCUMENTS 7,674,200 B2 * 3/2010 Shim ........................ F16H 3/666 475/276
8,636,617 B2 * 1/2014 Singh ........................ F16H 3/66 475/275
8,651,996 B2 * 2/2014 Mellet ..................... F16H 3/666 475/276

FOREIGN PATENT DOCUMENTS

FR 2885666 A1 * 11/2006 ............. F16H 3/663
KR 10-2013-0003981 A 1/2013

* cited by examiner

*Primary Examiner* — Jacob S. Scott
*Assistant Examiner* — James J Taylor, II
(74) *Attorney, Agent, or Firm* — Brinks Gilson & Lione

(57) ABSTRACT

A transmission for a vehicle capable is provided to improve fuel efficiency through multiple gear shift stages and enhance power performance of an engine. By combining first and second planetary gear sets, a compound planetary gear set, and multiple frictional elements selectively connecting rotary components of the three planetary gear sets via a corresponding shaft, the transmission provides eleven forward gear stages and three reverse gear stages. In particular, a first rotary element of the first planetary gear is fixedly connected to a transmission case, a second rotary element of the first planetary gear is fixedly connected to a second rotary element of the second planetary gear, and a third rotary element of the first planetary gear device is selectively connected to a first rotary element of the compound planetary gear set and a fourth rotary element of the compound planetary gear set.

11 Claims, 3 Drawing Sheets

CS
CS
CS
OUTPUT
A4
A3
A2
B1
B2
C1
C2
C3
C4
R1
R2
R3
R4
CR1
CR2
CR3
CR4
S1
S2
S3
S4
B3
INPUT
A5
A6
A1
PG1
PG2
PG3
PG4
CPG

FIG. 2

| GEAR SHIFT STAGE | C1 | C2 | C3 | C4 | B1 | B2 | B3 |
|---|---|---|---|---|---|---|---|
| 1 | | | | | | ● | ● |
| 2 | ● | | | | | ● | |
| 3 | | ● | | | | ● | |
| 4 | | | ● | | | ● | |
| 5 | | ● | ● | | | | |
| 6 | ● | | ● | | | | |
| 7 | | | ● | | | | ● |
| 8 | | | ● | ● | | | |
| 9 | | | | ● | | | ● |
| 10 | ● | | | ● | | | |
| 11 | | ● | | ● | | | |
| R1 | | | | | ● | | ● |
| R2 | ● | | | | ● | | |
| R3 | | ● | | | ● | | |

TRANSMISSION FOR VEHICLE

CROSS REFERENCE TO RELATED APPLICATION

This application claims priority to and the benefit of Korean Patent Application No. 10-2017-0088224, filed on Jul. 12, 2017, which is incorporated herein by reference in its entirety.

FIELD

The present disclosure relates to a transmission for a vehicle capable of improving fuel efficiency according to multiple gear shift stages and enhancing power performance.

BACKGROUND

The statements in this section merely provide background information related to the present disclosure and may not constitute prior art.

A recent increase in oil price has led automobile companies throughout the world to infinite competition toward improvement of fuel efficiency and efforts have been made to downsize engines to reduce weight in order to improve fuel efficiency.

Meanwhile, among various fuel efficiency improvement methods, automatic transmission configured to perform multiple stages have been developed to improve fuel efficiency as well as to secure operability.

However, as gear shift stages are increased, the number of internal components constituting an automatic transmission may also be increased, which negatively impacts on mountability, cost, weight, and transmission efficiency.

Thus, in order to improve fuel efficiency through multiple gear shift stages, we have discovered that it may be important to devise a gear train structure capable of obtaining maximum efficiency with reduced number of components.

The foregoing is intended merely to aid in the understanding of the background of the present disclosure, and is not intended to mean that the present disclosure falls within the purview of the related art that is already known to those skilled in the art.

SUMMARY

The present disclosure provides a transmission for a vehicle, capable of enhancing fuel efficiency according to multiple gear shift stages and enhancing power performance.

In one form of the present disclosure, a transmission for a vehicle includes: a first planetary gear device including first, second and third rotary elements; a second planetary gear device including first, second and third rotary elements; a compound planetary gear set including first, second, third and fourth rotary elements; and a plurality of frictional elements configured to selectively engage with at least one of the rotary elements of the first planetary gear device, the second planetary gear device and the compound planetary gear set.

In particular, the first rotary element of the first planetary gear device is fixedly connected to a transmission case, the second rotary element of the first planetary gear device is fixedly connected to the second rotary element of the second planetary gear device, and the third rotary element of the first planetary gear device is selectively connected to the first rotary element of the compound planetary gear set and the fourth rotary element of the compound planetary gear set.

In addition, the first rotary element of the second planetary gear device is configured to be selectively connected to the transmission case, the second rotary element of the second planetary gear device is fixedly connected to an input shaft, and the third rotary element of the second planetary gear device is fixedly connected to the first rotary element of the compound planetary gear set. Furthermore, the first rotary element of the compound planetary gear set is configured to be selectively connected to the input shaft, the second rotary element of the compound planetary gear set is selectively connected to the transmission case and selectively connected to the input shaft, the third rotary element of the compound planetary gear set is fixedly connected to an output shaft, and the fourth rotary element of the compound planetary gear set is configured to selectively connected to the transmission case.

In one form, the first planetary gear device may be a single pinion planetary gear device in which the first rotary element is a first sun gear, the second rotary element is a first carrier, and the third rotary element is a first ring gear, and the second planetary gear device may be a double pinion planetary gear device in which the first rotary element is a second sun gear, the second rotary element is a second carrier, and the third rotary element is a second ring gear.

In another form, the compound planetary gear set may be configured by combining a third planetary gear device as a single pinion planetary gear device and a fourth planetary gear device as a single pinion planetary gear device, wherein the first rotary element of the compound planetary gear set may be configured by directly connecting a third sun gear of the third planetary gear device and a fourth sun gear of the fourth planetary gear device, the second rotary element of the compound planetary gear set may be a fourth carrier of the fourth planetary gear device, the third rotary element of the compound planetary gear set may be configured by directly connecting a third carrier of the third planetary gear device and a fourth ring gear of the fourth planetary gear device, and the fourth rotary element of the compound planetary gear set may be a third ring gear of the third planetary gear device.

The plurality of frictional elements may include: a first brake configured to selectively connect the fourth carrier to the transmission case; a second brake configured to selectively connect the third ring gear to the transmission case; a third brake configured to selectively connect the second sun gear to the transmission case; a first clutch configured to selectively engage the input shaft with the third sun gear and the fourth sun gear; a second clutch configured to selectively engage the first ring gear with the third sun gear and the fourth sun gear; a third clutch configured to selectively engage the fourth carrier with the input shaft; and a fourth clutch configured to selectively engage the first ring gear with the third ring gear.

The plurality of frictional elements may include: a first brake configured to selectively connect the second rotary element of the compound planetary gear set and the transmission case; a second brake configured to selectively connect the fourth rotary element of the compound planetary gear set and the transmission case; a third brake configured to selectively connect the first rotary element of the second planetary gear device and the transmission case; a first clutch configured to selectively engage the input shaft with the first rotary element of the compound planetary gear set; a second clutch configured to selectively engage the third rotary element of the first planetary gear device with the first rotary element of the compound planetary gear set; a third clutch configured to selectively engage the input shaft with the second rotary element of the compound planetary gear set; and a fourth clutch configured to selectively engage the third rotary element of the first planetary gear device with the fourth rotary element of the compound planetary gear set.

According to another exemplary form of the present disclosure, a transmission for a vehicle including a first planetary gear device, a second planetary gear device and a compound planetary gear set may further include: an input shaft directly connected to a first clutch, a third clutch, and a second rotary element of the second planetary gear device configured to be fixedly connected to a second rotary element of the first planetary gear device; a first shaft directly connected to the first clutch, a first rotary element of the compound planetary gear set, a third rotary element of the second planetary gear device, and a second clutch; a second shaft directly connected to a first brake, the third clutch, and a second rotary element of the compound planetary gear set; a third shaft directly connected to a second brake, a fourth clutch, and a fourth rotary element of the compound planetary gear set; a fourth shaft directly connected to the second clutch, the fourth clutch, and a third rotary element of the first planetary gear device; a fifth shaft directly connected to a third brake and a first rotary element of the first planetary gear device; a sixth shaft disposed between the third brake and a first rotary element of the second planetary gear device so as to connected to each other; and an output shaft connected to a third rotary element of the compound planetary gear set.

The first brake may be selectively connect the second shaft and a transmission case, the second brake may be selectively connect the third shaft and a transmission case, the third brake may be selectively connect the sixth shaft and the transmission case, the first clutch may be disposed between the input shaft and the first shaft, the second clutch may be disposed between the first shaft and the fourth shaft, the third clutch may be disposed between the input shaft and the second shaft, and the fourth clutch may be disposed between the third shaft and the fourth shaft.

The second rotary element of the compound planetary gear set is coupled with the second shaft so as to be selectively connected to the transmission case by the first brake, the fourth rotary element of the compound planetary gear set is coupled with the third shaft so as to be selectively connected to the transmission case by the second brake, and the first rotary element of the second planetary gear device is coupled with the sixth shaft so as to be selectively connected to the transmission case by the third brake.

In another form, the first clutch is configured to engage the input shaft with the first rotary element of the compound planetary gear set, the second clutch is configured to engage the third rotary element of the first planetary gear device with the first rotary element of the compound planetary gear set, the third clutch is configured to engage the input shaft with the second rotary element of the compound planetary gear set, and the fourth clutch is configured to engage the third rotary element of the first planetary gear device with the fourth rotary element of the compound planetary gear set.

The first planetary gear device may be a single pinion planetary gear device in which the first rotary element is a first sun gear, the second rotary element is a first carrier, and the third rotary element is a first ring gear, the second planetary gear device may be a double pinion planetary gear device in which the first rotary element is a second sun gear, the second rotary element is a second carrier, and the third rotary element is a second ring gear, and the compound planetary gear set may be configured by combining a third planetary gear device as a single pinion planetary gear device and a fourth planetary gear device as a single pinion planetary gear device, wherein the first rotary element of the compound planetary gear set may be configured by directly connecting a third sun gear of the third planetary gear device and a fourth sun gear of the fourth planetary gear device, the second rotary element of the compound planetary gear set may be a fourth carrier of the fourth planetary gear device, the third rotary element of the compound planetary gear set may be configured by directly connecting a third carrier of the third planetary gear device and a fourth ring gear of the fourth planetary gear device, and the fourth rotary element of the compound planetary gear set may be a third ring gear of the third planetary gear device.

As described above, in the present disclosure, by combining the four planetary gear devices, gear shifting may be performed as a rotation speed and a direction are changed according to selective controlling operations using the rotary elements of the planetary gear devices and the multiple frictional elements, and through the gear shifting operation, gear ratios of at least eleven forward gear stages and three reverse gear stages may be implemented to drive a vehicle. Thus, since the automatic transmission have multiple gear shift stages, fuel efficiency may be improved and power performance may be enhanced, and also, since operating points of a low RPM region of the engine are used, quiet running performance of the vehicle may be enhanced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a table illustrating operations of respective gear shift stages of a transmission in one exemplary form of the present disclosure.

Figure 1:
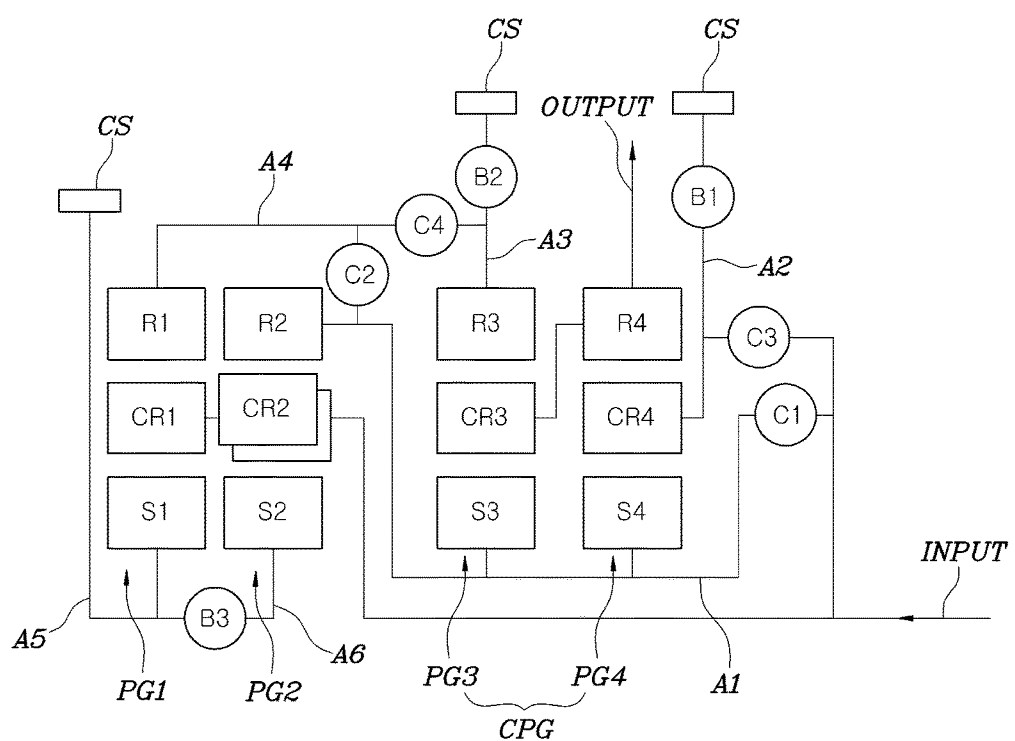
FIG. 1 is configuration diagram of a structure of a transmission for a vehicle in one exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Here, the term “fixedly connected” or the like means at least two members are connected to each other to always rotate together. Therefore, it is to be understood by a person of an ordinary skill in the art that the term "fixedly connected" or the like differs from the term "operably connected" or the like.

The term "selectively connected" or the like means at least two members (e.g. a plurality of shafts including the input shaft and the output shaft, or plurality of rotary elements) that are connectable and disconnectable to/from each other, e.g. through at least one intermediate member or a shifting element, and when connected rotate with the same rotational speed, or are connectable to the transmission housing through at least one intermediate member to be fixed to the transmission housing A transmission for a vehicle of the present disclosure may include a first planetary gear device PG1, a second planetary gear device PG2, and a compound planetary gear set CPG, and three or more rotary elements may be rotatably provided in these planetary gear devices.

FIGS. 1 and 2 illustrate a structure of a transmission for a vehicle according to an exemplary form of the present disclosure. Referring to FIGS. 1 and 2, a first rotary element of the first planetary gear device PG1 may operate as a regular fixed element.

For example, the first rotary member of the first planetary gear device PG1 may be a first sun gear S1, and the first sun gear S1 may be connected to a transmission case CS.

Here, the first planetary gear device PG1 is a single pinion planetary gear device in which the first rotary element may be the first sun gear S1, a second rotary element may be a first carrier CR1, and a third rotary element may be a first ring gear R1.

Also, the second rotary element of the first planetary gear device PG1 may be directly connected to a second rotary element of the second planetary gear device PG2.

For example, the second rotary element of the first planetary gear device PG1 may be the first carrier CR1, and a second rotary element of the second planetary gear device PG2 may be a second carrier CR2, and the first carrier CR1 and the second carrier CR2 may be directly connected to each other.

Here, the second planetary gear device PG2 is a double pinion planetary gear device in which a first rotary element may be a second sun gear S2, a second rotary element may be the second carrier CR2, and a third rotary element may be a second ring gear R2.

Also, the third rotary element of the first planetary gear device PG1 may be selectively connected to the first rotary element of the compound planetary gear set CPG and selectively connected to a fourth rotary element of the compound planetary gear set CPG.

For example, the third rotary element of the first planetary gear device PG1 may be the first ring gear R1, and a first rotary element of the compound planetary gear set CPG may be a third sun gear S3 and a fourth sun gear S4, and the first ring gear R1 may be selectively connected to the third sun gear S3 and the fourth sun gear S4 by a frictional element.

Also, the fourth rotary element of the compound planetary gear set CPG may be the third ring gear R3, and the first ring gear R1 and the third ring gear R3 may be selectively connected by a frictional element.

Here, the compound planetary gear set CPG may be configured by combining a third planetary gear set PG3 and a fourth planetary gear set PG4 as a group of single pinion planetary gear devices, and a first rotary element of the compound planetary gear set CPG may be configured by directly connecting the third sun gear S3 of the third planetary gear device PG3 and the fourth sun gear S4 of the fourth planetary gear device PG4.

Also, a second rotary element of the compound planetary gear set CPG may be a fourth carrier CR4 of the fourth planetary gear device PG4.

Also, a third rotary element of the compound planetary gear set CPG may be formed as the third carrier CR3 of the third planetary gear device PG3 and a fourth ring gear R4 of the fourth planetary gear device PG4.

Also, a fourth rotary element of the compound planetary gear set CPG may be a third ring gear R3 of the third planetary gear device PG3.

The first rotary element of the second planetary gear device PG2 may operate as a selective fixed element.

For example, the first rotary element of the second planetary gear device PG2 may be the second sun gear S2, and the second sun gear S2 may be selectively connected to the transmission case CS by a frictional element.

Also, the second rotary element of the second planetary gear device PG2 may be directly connected to an input shaft INPUT.

For example, the second rotary element of the second planetary gear device PG2 may be the second carrier CR2, and the second carrier CR2 may be directly connected to the input shaft INPUT.

Also, a third rotary element of the second planetary gear device PG2 may be directly connected to the first rotary element of the compound planetary gear set CPG.

For example, the second rotary element of the second planetary gear device PG2 may be the second carrier CR2, and the second carrier CR2 may be directly connected to the input shaft INPUT.

Also, the third rotary element of the second planetary gear device PG2 may be directly connected to the first rotary element of the compound planetary gear set CPG.

For example, the third rotary element of the second planetary gear device PG2 may be the second ring gear R2, and the second ring gear R2 may be directly connected to the third sun gear S3 and the fourth sun gear S4.

The first rotary element of the compound planetary gear set CPG may be selectively connected to the input shaft INPUT.

For example, the first rotary element of the compound planetary gear set CPG may be the third sun gear S3 and the fourth sun gear S4, and the third sun gear S3 and the fourth sun gear S4 may be selectively connected to the input shaft INPUT by a frictional element.

Also, the second rotary element of the compound planetary gear set CPG may operate as a selective fixed element and selectively connected to the input shaft INPUT.

For example, the second rotary element of the compound planetary gear set CPG may be a fourth carrier CR4, and the fourth carrier CR4 may be selectively connected to the transmission case CS by a frictional element.

Also, the fourth carrier CR4 may be selectively connected to the input shaft INPUT by a frictional element.

Also, the third rotary element of the compound planetary gear set CPG may be directly connected to the output shaft OUTPUT.

For example, the third rotary element of the compound planetary gear set CPG may be configured by directly connecting the third carrier CR3 and the fourth ring gear R4 to each other, and the third carrier CR3 and the fourth ring gear R4 may be directly connected to the output shaft OUTPUT.

Also, the fourth rotary element of the compound planetary gear set CPG may operate as a selective fixed element.

For example, the fourth rotary element of the compound planetary gear set CPG may be the third ring gear R3, and the third ring gear R3 may be selectively connected to the transmission case CS by a frictional element.

Also, in the transmission for a vehicle having the aforementioned components, the first planetary gear device PG1, the second planetary gear device PG2, and the compound planetary gear set CPG may be sequentially arranged in an axial direction of the input shaft INPUT.

The transmission structure of the present disclosure, may further include a plurality of frictional elements connected to at least one of the rotary elements configuring the planetary gear devices and controlling rotation of the corresponding rotary element. The frictional elements may be first, second, and third brakes B1, B2, and B3 and first, second, third, and fourth clutches C1, C2, C3, and C4.

In detail, the first brake B1 may be controllably connected between the fourth carrier CR4 (i.e., the second rotary element of the compound planetary gear set CPG) and the transmission case CS.

The second brake B2 may be controllably connected between the third ring gear R3 (i.e., the fourth rotary element of the compound planetary gear set CPG) and the transmission case CS.

The third brake B3 may be controllably connected between the second sun gear S2 (i.e., the first rotary element of the second planetary gear device PG2) and the transmission case CS.

The first clutch C1 may be controllably connected between the input shaft INPUT and the third sun gear S3 and the fourth sun gear S4, the first rotary elements of the compound planetary gear set CPG.

The second clutch C2 may be controllably connected between the first ring gear R1, the third rotary element of the first planetary gear device PG1, and the third sun gear S3 and the fourth sun gear S4, the first rotary elements of the compound planetary gear set CPG.

The third clutch C3 may be controllably connected between the input shaft INPUT and the fourth carrier CR4, the second rotary element of the compound planetary gear set CPG.

The fourth clutch C4 may be controllably connected between the first ring gear R1, the third rotary element of the first planetary gear device PG1, and the third ring gear R3, the fourth rotary element of the composite planetary gear set CPG.

Meanwhile, the transmission for a vehicle according to the present disclosure may be configured by connecting the rotary elements configuring the respective planetary gear devices and frictional elements to the input shaft INPUT, first to sixth shafts A1 to A6, and the output shaft OUTPUT.

Referring to FIG. 1, one end of the first clutch C1, one end of the third clutch C3, the second rotary element of the second planetary gear device PG2, and the second rotary element of the first planetary gear device PG1 may be connected to the input shaft INPUT.

The other end of the first clutch C1, the first rotary element of the compound planetary gear set CPG, the third rotary element of the second planetary gear device PG2, and one end of the second clutch C2 may be connected to the first shaft A1.

The first brake B1, the other end of the third clutch C3, and the second rotary element of the compound planetary gear set CPG may be connected to the second shaft A2.

The second brake B2, one end of the fourth clutch C4, and the fourth rotary element of the compound planetary gear set CPG may be connected to the third shaft A3.

The other end of the second clutch C2, the other end of the fourth clutch C4, and the third rotary element of the first planetary gear device PG1 may be connected to the fourth shaft A4.

The third brake B3 and the first rotary element of the first planetary gear device PG1 may be connected to the fifth shaft A5.

The third brake B3 and the first rotary element of the second planetary gear device PG2 may be connected to the sixth shaft A6.

The third rotary element of the compound planetary gear set CPG may be connected to the output shaft OUTPUT.

Also, the first brake B1, the second brake B2, and the third brake B3 may be connected to the transmission case CS.

For example, the first brake B1 may be controllably connected between the second shaft A2 and the transmission case CS, the second brake B2 may be controllably connected between the third shaft A3 and the transmission case CS, and the third brake B3 may be controllably connected between the sixth shaft A6 and the transmission case CS.

Also, the first clutch C1 may be controllably connected between the input shaft INPUT and the first shaft A1, the second clutch C2 may be controllably connected between the first shaft A1 and the fourth shaft A4, the third clutch may be controllably connected between the input shaft INPUT and the second shaft A2, and the fourth clutch C4 may be controllably connected between the third shaft A3 and the fourth shaft A4.

In detail, the first brake B1 may be controllably connected between the fourth carrier CR4, the second rotary element of the compound planetary gear set CPG, and the transmission case CS.

The second brake B2 may be controllably connected between the third ring gear R3 (i.e., the fourth rotary element of the compound planetary gear set CPG) and the transmission case CS.

The third brake B3 may be controllably connected between the sun gear S2 (i.e., the first rotary element of the second planetary gear device PG2) and the transmission case CS.

The first clutch C1 may be controllably connected between the input shaft INPUT and the third sun gear S3 and the fourth sun gear S4, the first rotary elements of the compound planetary gear set CPG.

The second clutch C2 may be controllably connected between the first ring gear R1, the third rotary element of the first planetary gear device PG1, and the third sun gear S3 and the fourth sun gear S4, the first rotary elements of the compound planetary gear set CPG.

The third clutch C3 may be controllably connected between the input shaft INPUT and the fourth carrier CR4, the second rotary element of the compound planetary gear set CPG.

The fourth clutch C4 may be controllably connected between the first ring gear R1, the third rotary element of the first planetary gear set PG1, and the third ring gear R3, the fourth rotary element of the compound planetary gear set CPG.

FIG. 2 is a table illustrating operations of respective gear shift stages of a transmission according to an exemplary form of the present disclosure. For example, in order to implement a first stage gear ratio, the second brake B2 and the third brake B3 are fastened and the other frictional elements are all opened to form the first stage gear ratio.

Figure 3:
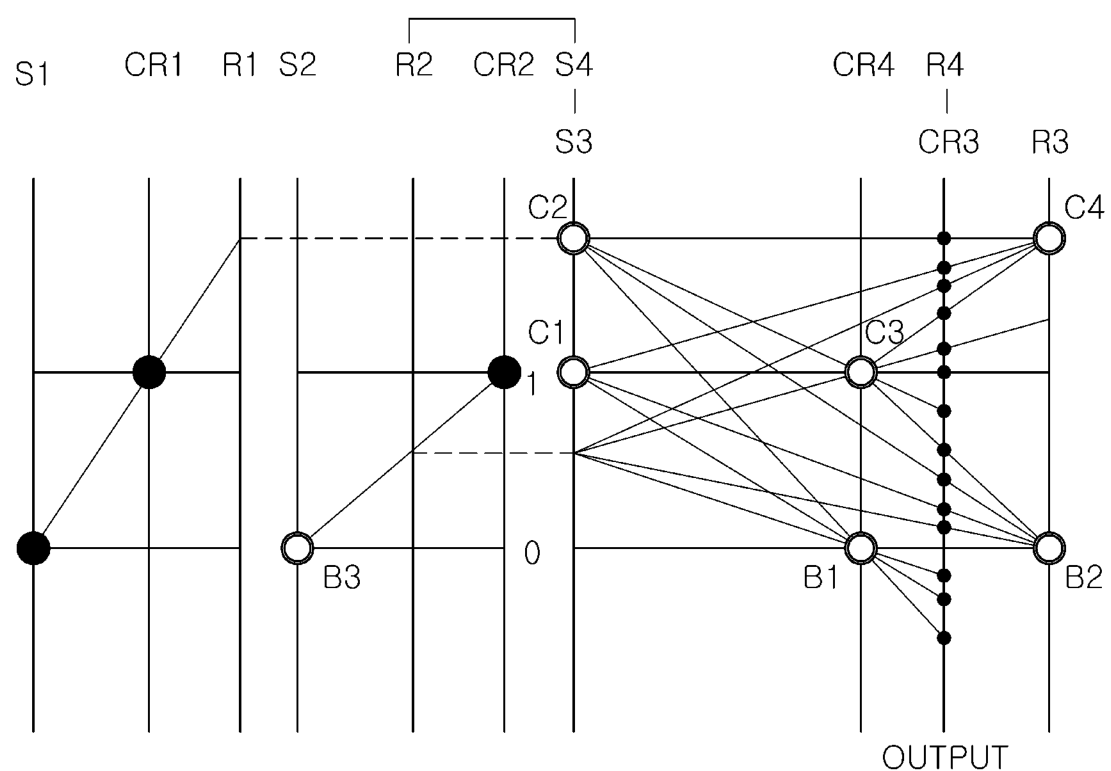
FIG. 3 is a diagram illustrating lever wires according to a controlling operation of frictional elements in one exemplary form the present disclosure.

FIG. 3 is a diagram illustrating lever wires according an exemplary form of the present disclosure. When rotation power is provided to the input shaft INPUT in a state in which the second brake B2 and the third brake B3 are fastened, the second sun gear S2 operates as a fixed element according to a fastening operation of the third brake B3 and rotation power is accordingly transmitted through the second ring gear R2.

Here, since the second ring gear R2 and the third sun gear S3 are directly connected and the second brake B2 is fastened and the third ring gear R3 operates as a fixed element, a rotation speed corresponding to a first stage gear ratio may be output to the output shaft OUTPUT through the third carrier CR3 and the fourth ring gear R4 directly connected to the third carrier CR3.

Also, in order to implement a second stage gear ratio, the first clutch C1 and the second brake B2 may be fastened and the other frictional elements may be opened to form the second stage gear ratio. Also, gear ratios of the other gear shift stages may also be implemented through the controlling operations illustrated in the operation table to drive a vehicle.

As described above, in the present disclosure, by combining the four planetary gear devices and seven frictional elements, gear shifting may be performed as a rotation speed and a direction are changed according to selective controlling operations using the rotary elements of the planetary gear devices and the multiple frictional elements, and through the gear shifting operation, gear ratios of at least 11 forward gear stages and 3 backward gear stages may be implemented to drive a vehicle. Thus, since the automatic transmission has multiple gear shift stages, fuel efficiency may be improved, and also, since operating points of a low RPM region of the engine are used, power performance and quiet running performance of the vehicle may be enhanced.

Although the present disclosure has been shown and described with respect to specific exemplary forms, it will be obvious to those skilled in the art that the present disclosure may be variously modified and altered without departing from the spirit and scope of the present disclosure as defined by the following claims.

What is claimed is:

1. A transmission for a vehicle, comprising:

a first planetary gear device including first, second and third rotary elements;

a second planetary gear device including first, second and third rotary elements;

a compound planetary gear set including first, second, third and fourth rotary elements; and a plurality of frictional elements configured to selectively engage with at least one of the rotary elements of the first planetary gear device, the second planetary gear device and the compound planetary gear set, wherein the first rotary element of the first planetary gear device is fixedly connected to a transmission case, the second rotary element of the first planetary gear device is fixedly connected to the second rotary element of the second planetary gear device, and the third rotary element of the first planetary gear device is selectively connected to the first rotary element of the compound planetary gear set and the fourth rotary element of the compound planetary gear set, wherein the first rotary element of the second planetary gear device is configured to be selectively connected to the transmission case, the second rotary element of the second planetary gear device is fixedly connected to an input shaft, and the third rotary element the second planetary gear device is fixedly connected to the first rotary element of the compound planetary gear set, and wherein the first rotary element of the compound planetary gear set is configured to be selectively connected to the input shaft, the second rotary element of the compound planetary gear set is configured to be selectively connected to the transmission case and selectively connected to the input shaft, the third rotary element of the compound planetary gear set is fixedly connected to an output shaft, and the fourth rotary element of the compound planetary gear set is configured to be selectively connected to the transmission case.

2. The transmission of claim 1, wherein the first planetary gear device is a single pinion planetary gear device in which the first rotary element is a first sun gear, the second rotary element is a first carrier, and the third rotary element is a first ring gear, and the second planetary gear device is a double pinion planetary gear device in which the first rotary element is a second sun gear, the second rotary element is a second carrier, and the third rotary element is a second ring gear.

3. The transmission of claim 2, wherein the compound planetary gear set is configured by combining a third planetary gear device and a fourth planetary gear device, and wherein the first rotary element of the compound planetary gear set is configured by directly connecting a third sun gear of the third planetary gear device and a fourth sun gear of the fourth planetary gear device, the second rotary element of the compound planetary gear set is a fourth carrier of the fourth planetary gear device, the third rotary element of the compound planetary gear set is configured by directly connecting a third carrier of the third planetary gear device and a fourth ring gear of the fourth planetary gear device, and the fourth rotary element of the compound planetary gear set is a third ring gear of the third planetary gear device.

4. The transmission of claim 3, wherein the third planetary gear device is a single pinion planetary gear device, and the fourth planetary gear device is a single pinion planetary gear device.

5. The transmission of claim 3, wherein the plurality of frictional elements includes:

a first brake configured to selectively connect the fourth carrier to the transmission case;

a second brake configured to selectively connect the third ring gear to the transmission case;

a third brake configured to selectively connect the second sun gear to the transmission case;

a first clutch configured to selectively engage the input shaft with the third sun gear and the fourth sun gear;

a second clutch configured to selectively engage the first ring gear with the third sun gear and the fourth sun gear;

a third clutch configured to selectively engage the fourth carrier with the input shaft; and a fourth clutch configured to selectively engage the first ring gear with the third ring gear.

6. The transmission of claim 1, wherein the plurality of frictional elements includes:

a first brake configured to selectively connect the second rotary element of the compound planetary gear set to the transmission case;

a second brake configured to selectively connect the fourth rotary element of the compound planetary gear set to the transmission case;

a third brake configured to selectively connect the first rotary element of the second planetary gear device to the transmission case;

a first clutch configured to selectively engage the input shaft with the first rotary element of the compound planetary gear set;

a second clutch configured to selectively engage the third rotary element of the first planetary gear device with the first rotary element of the compound planetary gear set;

a third clutch configured to selectively engage the input shaft with the second rotary element of the compound planetary gear set; and a fourth clutch configured to selectively engage the third rotary element of the first planetary gear device with the fourth rotary element of the compound planetary gear set.

7. A transmission for a vehicle including a first planetary gear device, a second planetary gear device and a compound planetary gear set, the transmission comprising:

an input shaft directly connected to a first clutch, a third clutch, and a second rotary element of the second planetary gear device, the second rotary element of the second planetary gear device configured to be fixedly connected to a second rotary element of the first planetary gear device;

a first shaft directly connected to the first clutch, a first rotary element of the compound planetary gear set, a third rotary element of the second planetary gear device, and a second clutch;

a second shaft directly connected to a first brake, the third clutch, and a second rotary element of the compound planetary gear set;

a third shaft directly connected to a second brake, a fourth clutch, and a fourth rotary element of the compound planetary gear set;

a fourth shaft directly connected to the second clutch, the fourth clutch, and a third rotary element of the first planetary gear device;

a fifth shaft directly connected to a third brake and a first rotary element of the first planetary gear device;

a sixth shaft disposed between the third brake and a first rotary element of the second planetary gear device so as to connect to each other; and an output shaft connected to a third rotary element of the compound planetary gear set.

8. The transmission of claim 7, wherein the first brake is configured to selectively connect the second shaft to a transmission case, the second brake is configured to selectively connect the third shaft to the transmission case, the third brake is configured to selectively connect the sixth shaft to the transmission case, the first clutch is disposed between the input shaft and the first shaft, the second clutch is disposed between the first shaft and the fourth shaft, the third clutch is disposed between the input shaft and the second shaft, and the fourth clutch is disposed between the third shaft and the fourth shaft.

9. The transmission of claim 8, wherein the second rotary element of the compound planetary gear set is coupled with the second shaft so as to be selectively connected to the transmission case by the first brake, the fourth rotary element of the compound planetary gear set is coupled with the third shaft so as to be selectively connected to the transmission case by the second brake, and the first rotary element of the second planetary gear device is coupled with the sixth shaft so as to be selectively connected to the transmission case by the third brake.

10. The transmission of claim 9, wherein the first clutch is configured to engage the input shaft with the first rotary element of the compound planetary gear set, the second clutch is configured to engage the third rotary element of the first planetary gear device with the first rotary element of the compound planetary gear set, the third clutch is configured to engage the input shaft with the second rotary element of the compound planetary gear set, and the fourth clutch is configured to engage the third rotary element of the first planetary gear device with the fourth rotary element of the compound planetary gear set.

11. The transmission of claim 9, wherein the first planetary gear device is a single pinion planetary gear device in which the first rotary element is a first sun gear, the second rotary element is a first carrier, and the third rotary element is a first ring gear, the second planetary gear device is a double pinion planetary gear device in which the first rotary element is a second sun gear, the second rotary element is a second carrier, and the third rotary element is a second ring gear, and the compound planetary gear set is configured by combining a third planetary gear device as a single pinion planetary gear device and a fourth planetary gear device as a single pinion planetary gear device, and wherein the first rotary element of the compound planetary gear set is configured by directly connecting a third sun gear of the third planetary gear device and a fourth sun gear of the fourth planetary gear device, the second rotary element of the compound planetary gear set is a fourth carrier of the fourth planetary gear device, the third rotary element of the compound planetary gear set is configured by directly connecting a third carrier of the third planetary gear device and a fourth ring gear of the fourth planetary gear device, and the fourth rotary element of the compound planetary gear set is a third ring gear of the third planetary gear device.

* * * * *